Figure 1:
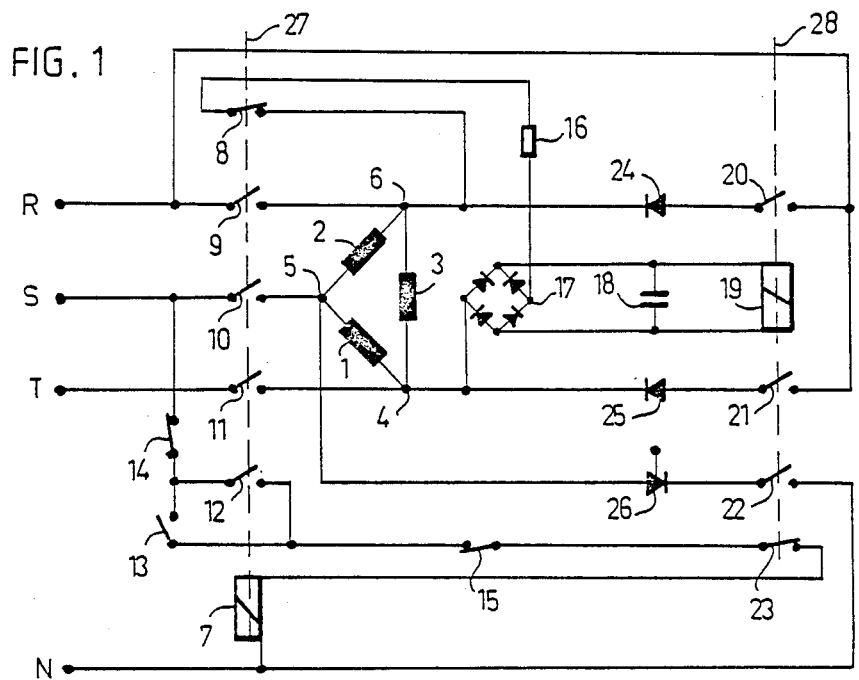

United States Patent [19]

Karjalainen

[11] Patent Number: 4,754,211
[45] Date of Patent: Jun. 28, 1988

[54] METHOD OF AND A DEVICE FOR BRAKING AN ASYNCHRONOUS MOTOR

[76] Inventor: Väinö Karjalainen, Länsitie 15, SF-11120 Riihimäki, Finland

[21] Appl. No.: 916,513
[22] PCT Filed: Jan. 27, 1986
[86] PCT No.: PCT/FI86/00011
§ 371 Date: Sep. 17, 1986
§ 102(e) Date: Sep. 17, 1986
[87] PCT Pub. No.: WO86/04753
PCT Pub. Date: Aug. 14, 1986

[30] Foreign Application Priority Data

Feb. 5, 1985 [FI] Finland .................................. 850461
Aug. 2, 1985 [FI] Finland .................................. 852983

[51] Int. Cl.$^4$ .................................................. H02P 3/24
[52] U.S. Cl. ...................................... 318/762; 318/760
[58] Field of Search ................... 318/759, 760, 761, 762

[56] References Cited

U.S. PATENT DOCUMENTS

| | | | |
|---|---|---|---|
| 2,929,977 | 3/1960 | Choudhury | 318/762 |
| 3,678,353 | 7/1972 | Marchi | 318/762 |
| 3,708,734 | 1/1973 | Rowe | 318/762 |
| 3,866,097 | 2/1975 | Anzai et al. | 318/761 |
| 4,115,727 | 9/1978 | Gross | 318/762 |
| 4,151,453 | 4/1979 | Suzuki et al. | 318/762 |
| 4,181,197 | 1/1980 | Tanabe et al. | 318/762 |
| 4,334,181 | 6/1982 | Schroeder | 318/762 |

*Primary Examiner*—David Smith, Jr.
*Attorney, Agent, or Firm*—Ladas & Parry

[57] ABSTRACT

The invention relates to a method of and a device for braking an asynchronous motor by applying a direct current to the field windings thereof. According to the invention, an AC voltage appearing at the outer terminals (4,6) of two mutually series-connected field windings (1,2) of the asynchronous motor acting as a generator is rectified and connected to a coil (19) of a braking current relay (28) immediately after the operating current of the motor has been switched out, whereby said braking current relay (28) picks up and a terminal (R) of a braking current source (R, N) is connected by contacts (20,21,22) of said braking current relay (28) through a semi-conductor (24) to an outer terminal (6) of said field windings (1,2) and through another semi-conductor (25) to another outer terminal (4) of said field windings (1,2), a terminal (5) common to said field windings (1,2) being connected through a braking current adjuster (26) to another terminal (N) of the braking current source (R, N). A direct current applied to the field windings (1,2) through said semi-conductors (24,25) maintains an alternating voltage in the outer terminals (4,6) of said field windings (1,2) and a hold current rectified therefrom in the coil (19) of the braking current relay (28) until the rotation of the short-circuit armature is completed or the speed of rotation thereof is reduced to a predetermined value, whereby the braking current relay (28) is released and the contacts (20,21,22) thereof disconnect the braking current.

10 Claims, 4 Drawing Sheets

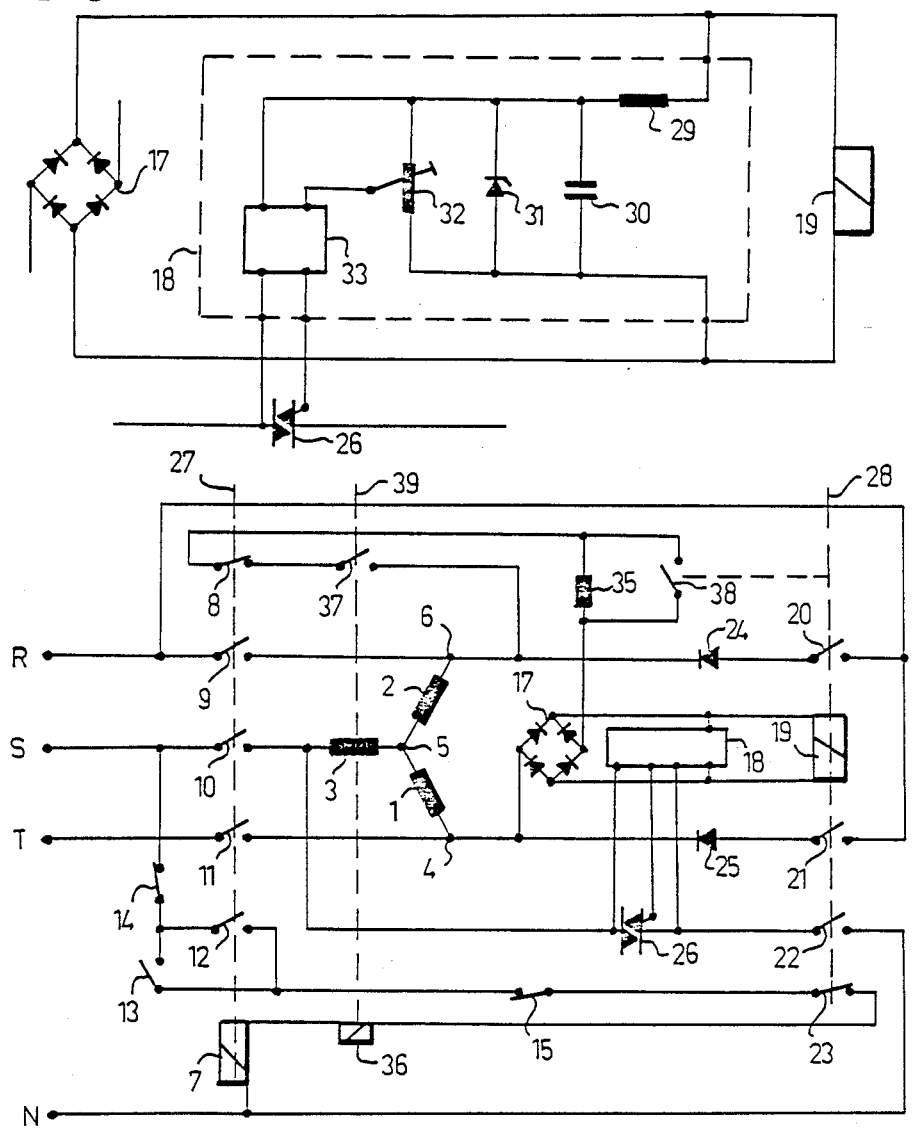
FIG. 3
FIG. 4
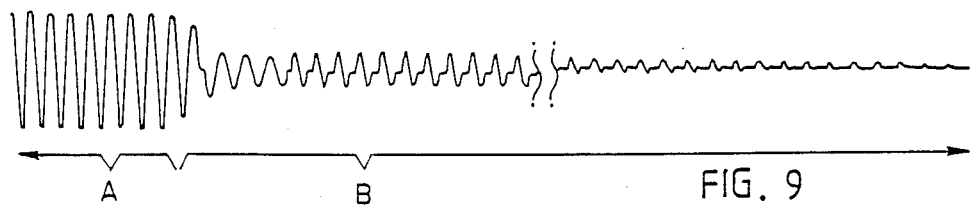
FIG. 9

METHOD OF AND A DEVICE FOR BRAKING AN ASYNCHRONOUS MOTOR

This invention relates to a device for braking an asynchronous motor, specifically by applying a direct current obtained from an AC voltage source through rectification to the field windings of said motor.

Previously known solutions for braking an asynchronous motor by means of a direct current applied to the field windings thereof are disclosed in e.g. German Offenlegungsschrifts Nos. 2,214,731 and 3,040,035. In these solutions, the duration of the braking is based on the setting of the braking time, which leads in inaccurate stops and resettings of the braking time if the speed of rotation of the motor and/or the fly mass connected to the armature is changed. Solutions for the elimination of the above disadvantages are disclosed in e.g. U.S. Pat. No. 4,392,098, German Offenlegungsschrift No. A1 3,110,841 and European Patent Specification No. A2 41,191, in which the control of the supply of a braking current to the field windings of a cage induction motor is effected by utilizing the frequency of the voltage induced in the field winding, the voltage induced in the field winding or the current induced in the field winding. These solutions have frequently led to relatively expensive technical realizations including a plurality of structural elements.

The object of the present invention is to provide a method and a device which enable a controlled braking of asynchronous motors irrespective of any changes in the speed of rotation of the motor and/or in the fly mass connected to the armature thereof and which can be used for starting and braking of single-phase, two-phase or multi-phase asynchronous motors.

The invention is mainly characterized by these features which are set forth in the enclosed claims.

Figure 2:
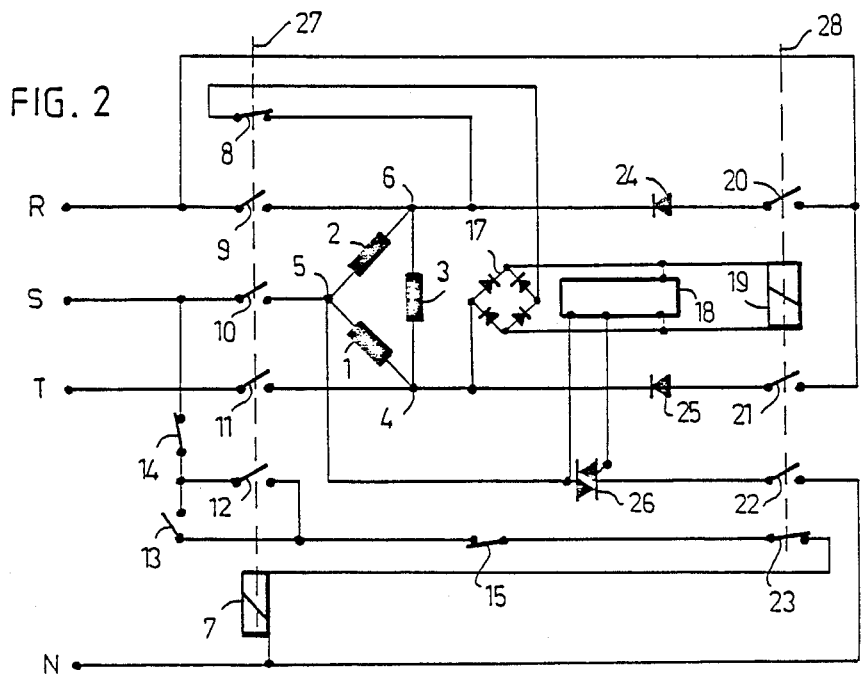
Figure 5:
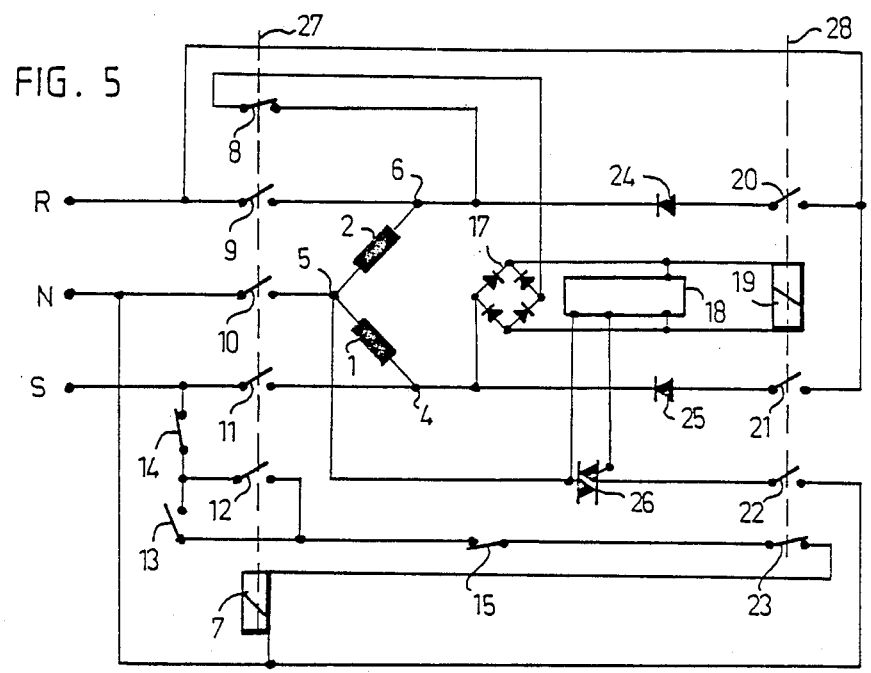
Figure 6:
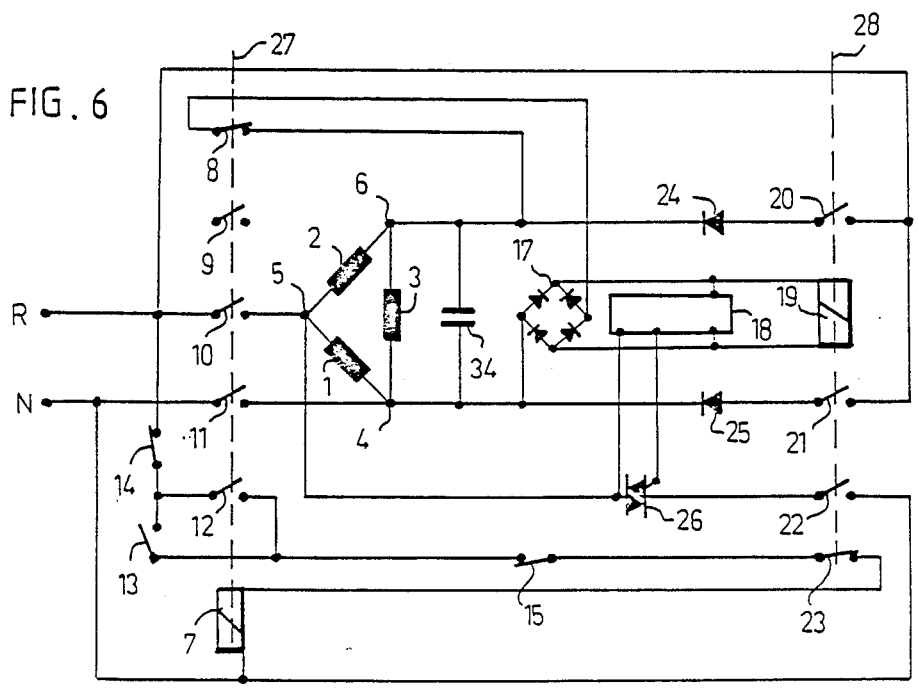
Figure 7:
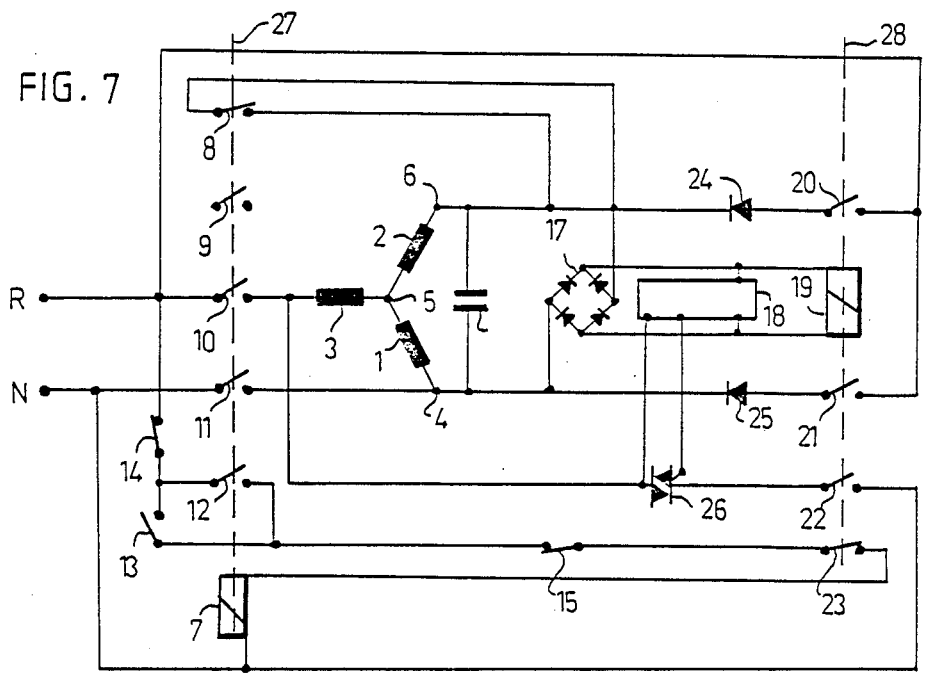
Figure 8:
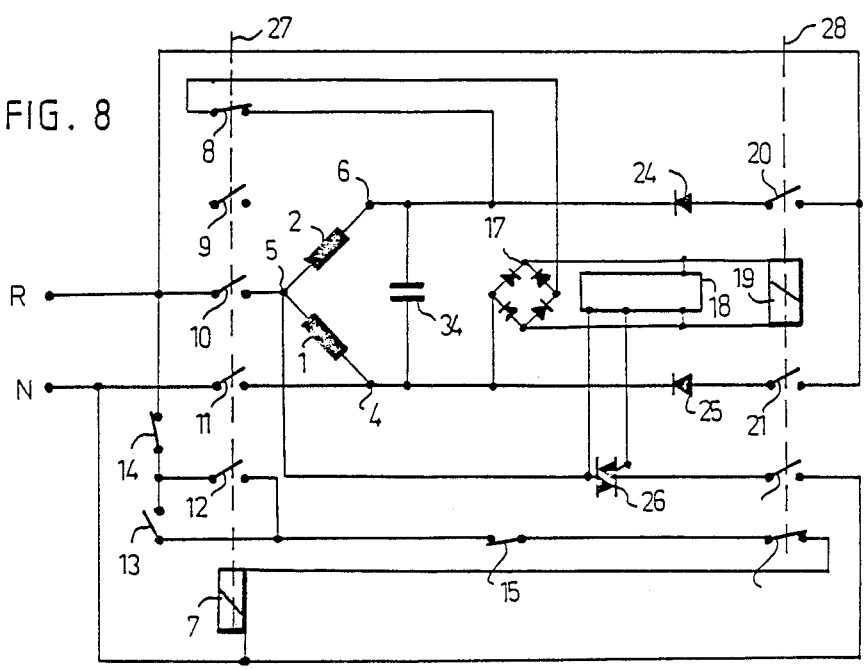

The invention will be described in the following by means of certain embodiments thereof with reference to the attached drawings, wherein FIG. 1 shows a circuit diagram of a device for starting and braking of a delta-connected squirrel cage motor supplied from a three-phase net, FIG. 2 shows a circuit diagram of a device according to another embodiment of the invention for starting and braking of a delta-connected squirrel cage motor supplied from a three-phase net, FIG. 3 shows a circuit diagram of a braking current control unit included in the device according to FIG. 2, FIG. 4 shows a circuit diagram of a device provided with a safety relay and intended for connecting and controlling a braking current to a star-connected squirrel cage motor supplied from a three-phase net, FIG. 5 shows a circuit diagram of a device for connecting and controlling a braking current to a squirrel cage motor supplied from a two-phase net, FIG. 6 shows a circuit diagram of a device for connecting and controlling a braking current to a delta-connected capacitor motor supplied from a one-phase net, FIG. 7 shows a circuit diagram of a device for connecting and controlling a braking current to a star-connected capacitor motor supplied from a one-phase net, FIG. 8 shows a circuit diagram of a device for connecting and controlling a braking current to a capacitor motor supplied from a one-phase net, and FIG. 9 shows the curveform of a the generator voltage generated by the embodiment of FIG. 1.

Similar components are indicated by the same references in all figures.

FIG. 1 shows terminals R, S, T, N of a three-phase net and delta-connected field windings 1, 2, 3 of a squirrel cage motor. To start the motor the terminal S is by a press-button switch 13 connected to the terminal N through a press-button stop switch 14, a press-button emergency switch 15, a contact 23 of a braking current relay 28 and a coil 7 of an operation current relay 27, whereby the operation current relay picks up, the contact 8 thereof is opened and the contacts 9, 10, 11 connect phase voltages from the terminals R,S,T to the terminals 6, 5, 4 of the field windings 1, 2, 3, the coil 7 obtaining a hold current through contacts 14, 12, 15, 23. To brake the motor the hold current circuit of the operation current relay 27 is disconnected by means of the press-button stop switch 14 or the press-button emergency switch 15, whereby the operation current relay 27 is released, the contacts 9, 10, 11, 12 thereof open to disconnect the operation current of the motor, the contact 8 closes to connect an alternating voltage induced in the field windings 1, 2, 3 by the residual magnetism and the rotatory motion of the iron core of a short-circuit armature from the terminals 4, 6 of two mutually series-connected field windings 1, 2 to a capacitor 18 through a resistor 16 and a rectifier 17, a coil 19 of the braking current relay 28 being connected to the terminals of the capacitor, whereby the braking current relay 28 picks up, the terminal R of the three-phase net used as a braking current source is connected through a diode 24 to an outer terminal 6 of the mutually series-connected field windings 1, 2 by a contact 20 and through a diode 25 to another outer terminal 4 of the mutually series-connected field windings 1, 2 and then the terminal 5 common to the mutually series-connected field windings 1, 2 is connected by a contact 22 through a braking current adjuster 26 to the terminal N of the braking current source. A direct current applied through the diodes 24, 25 in the same direction to the field windings 1, 2 of the motor maintains an alternating voltage in the outer terminals of the mutually series-connected field windings 1, 2 during the rotation of the short-circuit armature and simultaneously a hold current in the braking current relay 28, which hold current can be adjusted for different kinds of braking processes by means of a hold current adjuster 16 of the braking current relay 28 and/or the braking current adjuster 26 so that the braking current relay 28 is released and the contacts 20, 21, 22 thereof disconnect the braking current when the rotation of the short-circuit armature stops or its rate of rotation is reduced to a set value. The openable contact 23 of the braking current relay 28 disconnects the starting current circuit of the motor for the time of the braking.

In FIG. 9 the curveform A shows the operating voltage of the squirrel cage motor and the curveform B shows the generator voltage generated by the squirrel cage motor after disconnecting the operating voltage in the embodiment shown in FIG. 1, the generator voltage being measured at the outer terminals 4 and 6 of the series-connected field windings 1 and 2. This generator voltage is generated during the currentless half-cycles of the braking current supplied and half-wave-rectified through diodes 24 and 25. Since the same voltage acts at the AC terminals of the rectifier 17 during the current-carrying half-cycles of the braking current, this braking current does not develope a voltage at the DC terminals of the rectifier 17. The generator voltage shown in FIG.

9, however, is rectified to the DC side of the rectifier 17, as disclosed above referring to FIG. 1. The reason for the fact that the level of the generator voltage remains relatively high, as shown in FIG. 9, is, that the iron core of the motor is magnetized during the current-carrying half-cycles of the braking current. Therefore the level of the residual magnetism and thereby the level of the generator voltage is relatively high during the currentless half-cycles of the braking current especially when the motor is still rotating at a substantial speed.

Disadvantageous sparking and arching may occur in the contacts of the braking current relay of the device according to FIG. 1 even if several contacts are connected in series. This results in warming of the contacts, reduces the switching currents allowed for the contacts especially with higher operating voltages as well as the switching rate, shortens the useful time of the contacts and relays and reduce the reliability of operation of the device. These problems have been eliminated in the other embodiment of the device according to the invention, which embodiment is shown in FIGS. 2–8 in connection with different types of motors.

FIG. 2 shows terminals R,S,T, N of a three-phase net and delta-connected field windings 1, 2, 3 of a squirrel cage motor. To start the squirrel case motor the terminal S is connected to the terminal N by means of a start switch 13 through a stop switch 14, an emergency stop switch 15, a contact 23 of a braking current relay 28 and a coil 7 of an operation current relay 27, whereby the operating current relay 27 picks up, the contact 8 thereof is opened and contacts 9, 10, 11 apply phase voltages from the terminals R, S, T to terminals 6, 5, 4 of the field windings 1, 2, 3 and the coil 7 receives a hold current through a contact 12. To brake the motor the hold current circuit of the operating current relay 27 is disconnected by the stop switch 14 or the emergency stop switch 15, whereby the operating current relay 27 is released, the contacts 9, 10, 11 thereof are opened, thereby disconnecting the operating current of the motor, the contact 8 is closed, thereby applying a generator voltage induced in the field windings 1, 2, 3 by the residual magnetism of the iron core of a short circuit armature and the rotary motion of the armature from the outer terminals 4, 6 of two mutually series-connected field windings 1 and 2 through a rectifier 17 to a coil 19 of the braking current relay 28 and to a braking current control unit 18, whereby the braking current relay 28 picks up and contacts 20, 21, 22 thereof are closed, the contact 20 connects the terminal R of a braking current source RN through a semi-conductor 24 to the outer terminal 6 of the field windings 1, 2, the contact 21 connects said terminal R through a semi-conductor 25 to the other outer terminal 4 of the field windings 1, 2 and the contact 22 connects the other terminal N of the braking current source RN through a semi-conductor switch 26 being in a non-conductive state to the terminal 5 common to the field windings 1, 2, whereafter the control unit 18 renders the semi-conductor switch 26 conductive, whereby the braking current is switched on to energize the field windings 1, 2 until the control unit 18 renders the semi-conductor switch 26 non-conductive, whereafter the braking current relay 28 is released and the contacts 20, 21, 22 thereof are opened. As the contacts 20, 21, 22 of the braking current relay 28 are currentless when they are closed and opened, no sparking or arching occur therein. The openable contact 23 of the braking current relay 28 disconnects the starting current circuit of the squirrel cage motor for the time of the braking.

FIG. 3 shows a circuit diagram of the braking current control unit 18 together with the rectifier 17, the coil 19 of the braking current relay 28 and the semi-conductor switch 26 for the braking current. The control unit 18 comprises a preresistor 29, a capacitor 30, a zener diode 31, a LED-current adjusting resistor 32 and a opto-coupler 33. When the operating current of the squirrel cage motor is disconnected, a generator voltage of the squirrel cage motor is connected to the coil 19 of the braking current relay 28 and the braking current control unit 18 through the contact 8 of the operating current relay 27 and the rectifier 17, the braking current relay 28 picks up, the capacitor 30 being simultaneously charged through the preresistor 29. When the charge obtains a predetermined voltage level, the opto-coupler 33 renders the semi-conductor switch 26 for example a triac conductive, whereby the braking current is applied to the field windings 1, 2. The zener diode 31 limits the charge of the capacitor 30 to a predetermined voltage level. The rate of rotation and the generator voltage of the squirrel cage motor are reduced to zero by the action of the braking and the voltage in the capacitor 30 is likewise reduced by the action of the LED-current and the hold current of the braking current relay 28, the opto-coupler 33 renders the semi-conductor switch 26 non-conductive and the braking current is disconnected, but the braking current relay 28 still receives a hold current from the capacitor 30 through the preresistor 29, until the braking current relay 28 is released as the voltage in the capacitor 30 is decreased to a predetermined level. The squirrel cage motor can be braked from the full speed of rotation thereof to a lower value by means of the control unit 18, whereby it is left freely rotating and can also be restarted. The opto-coupler 33 can be a combination of a LED and a photoresistor or a combination of a LED and a photo-semi-conductor. The zener diode 31 can be replaced with a corresponding component for voltage limiting and stabilizing.

FIG. 4 illustrates switching and controlling a braking current in a star-connected squirrel cage motor energized by a three-phase net. The braking current is connected to flwo through the field windings 1, 2, 3 but it can as well be connected directly to the semi-conductor switch 26 from the terminal 5 common to the field windings 1, 2. Otherwise the switching and controlling of the braking current is similar to what is described in connection with FIGS. 2 and 3. In the device according to FIG. 4, a coil 36 of a time-delay relay 39 is connected in series with a coil 7 of the operating current relay 27. Some time after the hold current of the relay 27 has been disconnected, also the relay 39 is released, whereby a contact 37 is opened. This ensures that the braking current is disconnected also if some of the components associated with the braking process is damaged.

FIG. 5 illustrates switching and controlling a braking current in a squirrel cage motor energized by a two-phase net and provided with two mutually similar windings. The operation of the switching shown in FIG. 5 is identical with the operation of the device according to FIG. 2.

FIG. 6 illustrates switching and controlling a braking current in a delta-connected capacitor motor energized by a one-phase net. A capacitor 34 is connected to the outer terminals 4, 6 of series-connected field windings 1, 2. Otherwise the switching and controlling of the braking current is similar to what is described in connection with FIGS. 2 and 3.

FIG. 7 illustrates switching and controlling of a braking current in a star-connected capacitor motor energized by a one-phase net. A capacitor 34 is connected to the outer terminals 4, 6 of series-connected field windings 1, 2. The braking current flows through a third field winding 3 but can as well be connected directly to a semi-conductor switch 26 from a terminal 5 common to the field windings 1, 2. Otherwise the switching and controlling of the braking current is similar to that described in connection with FIGS. 2 and 3.

FIG. 8 illustrates switching and controlling of a braking current in a capacitor motor energized by a one-phase net. A capacitor 34 is connected to the outer terminals 4, 6 of series-connected field windings 1, 2. Otherwise the switching and controlling of the braking current corresponds to the operation described in connection with FIGS. 2 and 3.

The method and devices according to the invention can be used for switching and controlling of a braking current applied to the field windings of a one-phase, two-phase or multi-phase squirrel cage motor.

The braking current control unit 18 can be used for controlling of a hold current of semi-conductor switches and/or direct-current relays also in connection with other devices.

I claim:

1. An arrangement for braking an asynchorous motor, the arrangement comprising:

a signle phase AC braking current source having first and second terminals, the second terminal being for connection to a common terminal of field windings of an asynchronous motor having at least two mutually series-connected field windings having the common terminal and two outer terminals;

braking current contacting means having at least two contacts connected one side to the first terminal of the AC braking current source and having open and closed positions, and control means for controlling the positions of the contacts;

first and second half-wave rectifier means for unidirectional current conduction therethrough in the same direction respectively between respective opposite sides of the contacts and respective ones of the outer terminals of the field windings, whereby a braking current from the AC source, as a half-wave rectified direct current, is applied to the field windings for braking the motor when the contacts are in their closed positions;

a full-wave rectifier bridge circuit having two AC terminals and two DC terminals for providing a DC voltage when an AC voltage is applied to the AC terminals, the AC terminals being for connection to the outer terminals of the field windings, whereby the DC voltage is provided by the DC terminals when the contracts are in their closed positions and the first and second rectifier means are not conducting if the motor is rotating and thus acting as a generator, the value of the voltage decreasing with decreasing rotational speed of the motor; and a braking current control unit connected to the control means for controlling the positions of the contacts and to the DC terminals of the full-wave rectifier bridge circuit for energization by the DC voltage thereat keeping the contacts closed as long as the DC voltage exceeds a given value.

2. An arrangement for braking an asynchronous motor, the arrangement comprising:

a single phase AC braking current source having first and second terminals, the second terminal being connected to a third outer terminal of an asynchornous motor having three star-connected field windings having one common terminal and first, second and the third outer terminals;

braking current contacting means having at least two contacts connected on one side to the first terminal of the AC braking current source and having open and closed positions, and control means for controlling the positions of the contacts;

first and second half-wave rectifier means for unidirectional current conduction therethrough in the same direction respectively between respective opposite sides of the contacts and respective ones of the first and second outer terminals of the field windings, whereby a braking current from the AC source, as a half-wave rectified direct current, is applied to the field windings for braking the motor when the contacts are in their closed positions;

a full-wave rectifier bridge circuit having two AC terminals and two DC terminals for providing a DC voltage when an AC voltage is applied to the AC terminals, the AC terminals being for connection to the first and second outer terminals of the field windings, whereby the DC voltage is provided by the DC terminals when the contacts are in their closed positions and the first and second rectifier means are not conducting if the motor is still rotating and thus acting as a generator, the value of the voltage decreasing with decreasing rotational speed of the motor; and a braking current control unit connected to the control means for controlling the positions of the contacts and to the DC terminals of the full-wave rectifier bridge circuit for energization by the DC voltage thereat keeping the contacts closed as long as the DC voltage exceeds a given value.

3. The arrangement as claimed in claim 1, and further comprising a braking current adjuster connected to the second terminal of the AC braking current source for connection to the common terminal of the at least two field windings.

4. The arrangement as claimed in claim 2, and further comprising a braking current adjuster connected to the second terminal of the AC braking current source for connection to the third outer terminal of the field windings.

5. The arrangement as claimed in claim 1, wherein the braking current control unit comprises a capacitor.

6. The arrangement as claimed in claim 2, wherein the braking current control unit comprises a capacitor.

7. The arrangement as claimed in claim 3, wherein the braking current control unit comprises a capacitor, an element stabilizing the voltage of the capacitor and, connected in parallel with the capacitor, and an optocoupler controlled by the voltage of the capacitor and having an output for control of the braking current adjuster.

8. The arrangement as claimed in claim 4, wherein the braking current control unit comprises a capacitor, an element stabilizing the voltage of the capacitor and, connected in parallel with the capacitor, and an optocoupler controlled by the voltage of the capacitor and having an output for control of the braking current adjuster.

9. The arrangement as claimed in claim 3, wherein the braking current adjuster is a semiconductor switch.

10. The arrangement as claimed in claim 4, wherein the braking current adjuster is a semiconductor switch.

* * * * *